United States Patent [19]

Elvegaard

[11] 4,194,712
[45] Mar. 25, 1980

[54] CLAMPING STRUCTURE

[76] Inventor: Eilif Elvegaard, Karstensens vei 30, N-1660 Lisleby, Norway

[21] Appl. No.: 942,355

[22] Filed: Sep. 14, 1978

[51] Int. Cl.² .......... F16L 3/22; B65D 63/00
[52] U.S. Cl. .................... 248/68 R; 24/278; 339/265 R
[58] Field of Search ............ 248/65, 68 R, 68 CB; 174/149 R; 24/278, 135 H, 263 DB; 285/61, 64; 339/265 R; 277/45, 130; 138/160

[56] References Cited

U.S. PATENT DOCUMENTS

| | | | |
|---|---|---|---|
| 2,956,323 | 10/1960 | Stoeltzlen | 339/265 R |
| 3,895,830 | 7/1975 | Madlem | 285/137 R |
| 4,018,411 | 4/1977 | Henning | 248/68 R |
| 4,057,082 | 11/1977 | King | 24/278 X |

FOREIGN PATENT DOCUMENTS 1170557 11/1969 United Kingdom .............. 248/68

Primary Examiner—James T. McCall

[57] ABSTRACT

A clamping structure for clamping of tubes or similar elements comprising at least one clamping-shoe-receiving frame for attachment to a substructure, and at least one clamping shoe for receiving and retaining the element or elements to be clamped, said frame defining a space for receiving the clamping shoe or shoes. At least one spacedefining side edge of the frame, and a side of said clamping shoe or shoes facing said side edge, are provided with cooperating guiding means for lateral fixing of the clamping shoe or shoes with respect to the frame, and there is provided at least one fastening plate for disposition between a clamping shoe and holding portions of the frame projecting beyond said clamping shoe, which plate is provided with means for exerting a clamping pressure force directed towards the clamping shoe.

10 Claims, 17 Drawing Figures

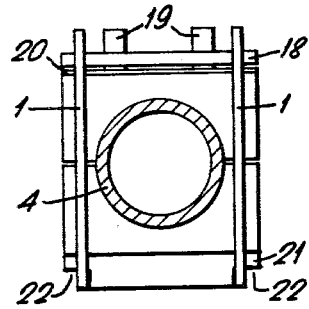
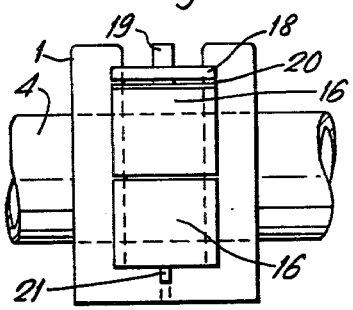
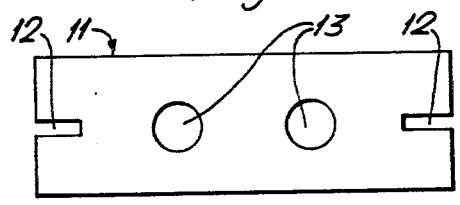
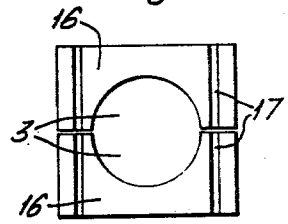
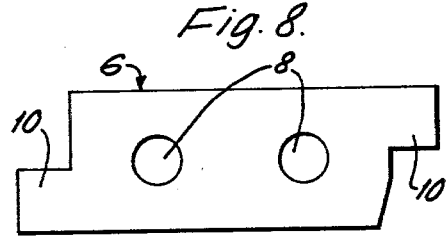
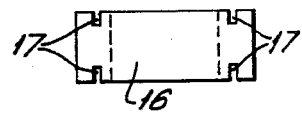
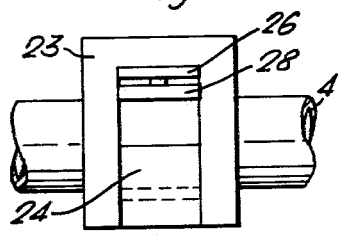
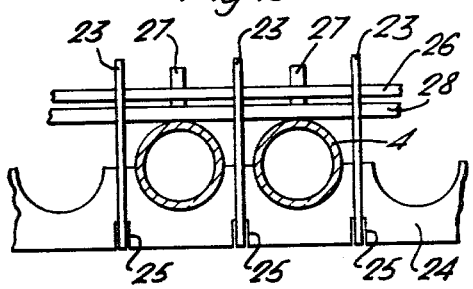

CLAMPING STRUCTURE

The present invention relates to a clamping structure for clamping of tubes or similar elements, comprising at least one clamping-shoe-receiving frame for attachment to a substructure, and at least one clamping shoe for receiving and retaining the element or elements to be clamped, said frame defining a space for receiving the clamping shoe or shoes.

It is previously known to manufacture clamping devices of a synthetic material which is corrosion-resistant. Such clamps are usually injection-molded in two halves and provided with holes for screws. By screw assembly of the clamps, holes are drilled in the substructure for the screws which extend through the clamping shoes and through the substructure with nuts on the underside. One of the drawbacks with this arrangement is that it is time-consuming and expensive to drill holes in the substructure, especially when this is made of steel and the drilling must be carried out on the assembly site. Another drawback of such clamps is that the clamps rest on the substructure with a relatively large surface. In case of access of moisture this surface is subjected to corrosion attacks.

In other cases clamping devices of the above mentioned types are fixed to the substructure by welding. Generally the clamps are then provided with rectangular steel plates with nuts thereon. By means of screws the clamps are fastened to the plates after these having been initially welded to the substructure. In order to avoid corrosion attacks on the faces between the plates and the substructure a continuous weld must be applied around these. Therefore this weld becomes disproportionally long and accordingly expensive. Besides, the corrosion problem will still be present, as this in such cases is transferred to the surface facing the clamping shoe.

Clamping devices which are injection-molded and based on screw assembly, must be given relatively large dimensions to give room for screw holes at the same time as the material thickness must be large to achieve sufficient strength. This implies that such clamps bluid relatively much, something which is often a drawback. Further, injection molding is a process requiring expensive tools and giving relatively low production rate. In total this results in that said types of clamping devices become relatively expensive.

It is an object of this invention to provide a clamping structure eliminating or alleviating the aforementioned drawbacks with respect to manufacture, assembly and maintenance costs, and which is thus relatively cheap to manufacture and assemble and is formed with a view to good access to the underside of the tube or tubes as well as to the substructure for maintenance, to thereby avoid corrosion damages.

Another object is to provide a clamping structure with a shape or configuration which is suitable for production in synthetic material, thereby reducing the corrosion problems.

According to the invention there is provided a clamping structure of the type set forth above wherein at least one space-defining side edge of the frame, and a side of said clamping shoe or shoes facing said side edge, are provided with cooperating guiding means for lateral fixing of the clamping shoe or shoes with respect to the frame, and wherein, for fastening of the clamping shoe or shoes in said frame, there is provided at least one fastening plate for disposition between a clamping shoe and holding portions of the frame projecting beyond said clamping shoe, which plate is provided with means for exerting a clamping pressure force directed towards the clamping shoe.

The clamping structure according to the invention results in a number of advantages with respect to manufacture and assembly. Among other things the clamping shoes may be produced from extruded material which is cut into parallel disks. The structure may be used by clamping of tubes, cables or similar elements, either individually or several elements side by side in one or more layers or planes. When clamping several tubes side by side one achieves a substantially reduced building width compared to conventional clamps based primarily on use of screws extending down to the substructure or support between the tubes. This is especially the case in connection with clamping of small tubes. By clamping of individual tubes one achieves a great strength in the longitudinal direction of the tube, something which is important by expansions. This strength is not especially dependent on the screws which are used, and these may therefore have relatively small dimensions. The strength of the clamping structure according to the invention lies in the use of the particular frame resulting in that the clamping shoes are not subjected to deflection. The screws can be placed within the size or extent of the tube and thereby great strength is achieved with the use of small screws. A corresponding strength of corresponding clamps based on screws for assembly, requires large dimensions of clamping shoes and screws, something which also increases the costs.

The clamping structure according to the invention simplifies assembly of tubes beneath ceilings. The special construction of the frame only requires small dimensions to achieve large strength. By screw mounting of the frame to the substructure only small screws are required as the screws are independent of the attachment of the clamping shoes to the frame. By weld mounting of the frame to the substructure only a small amount of weld is required compared to other clamps for welding assembly.

The invention will be more closely described below in connection with a number of exemplary embodiments with reference to the drawings, wherein FIGS. 1 and 2 illustrate a first embodiment of a clamping structure according to the invention, in front and side elevation view, respectively;

FIG. 8 shows a fastening plate in the embodiment according to FIGS. 1 and 2;

FIG. 9 shows a pressure distribution plate of the same embodiment;

FIGS. 10 and 11 illustrate a second embodiment of a clamping structure according to the invention, in front and side elevation view, respectively;

FIGS. 12 and 13 illustrate a pair of clamping shoes in the embodiment according to FIGS. 10 and 11, in front and plan view, respectively; and FIGS. 14 and 15 illustrate a further embodiment of a clamping structure according to the invention, for clamping of several tubes side by side by means of a common clamping shoe inserted in a number of frames located between adjacent tubes and oriented parallel to the tube axes.

Figure 1:
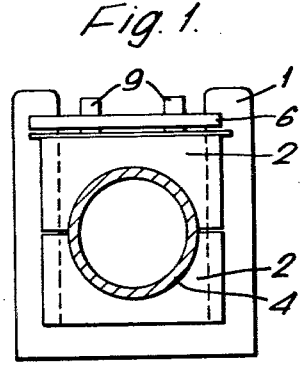
Figure 2:
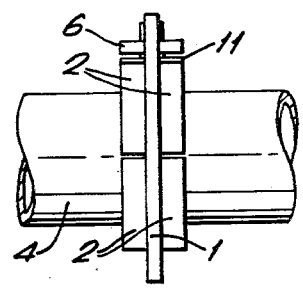
Figure 3:
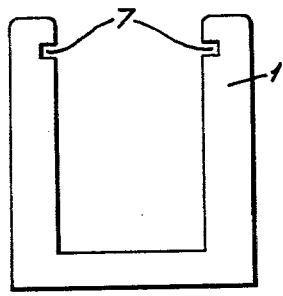
FIG. 3 shows a front view of the frame in the embodiment according to the FIGS. 1 and 2.
Figure 4:
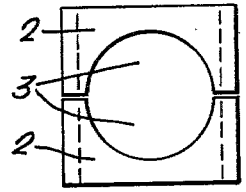
FIGS. 4 and 5 illustrate a pair of clamping shoes in the embodiment according to FIGS. 1-2, in front and side elevation view, respectively.
Figure 5:
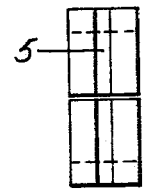

The clamping structure shown in FIGS. 1 and 2 comprises a frame 1 which is essentially U-shaped and has a horizontal web portion and vertical legs defining a room or recess for receiving a pair of clamp jaws or clamping shoes 2 with opposite, semi-cylindrical recesses 3 (see FIGS. 4–5) for receiving a tube 4 to be clamped. The shape of the frame 1 appears from FIG. 3. Such as best shown in FIGS. 4 and 5, opposite side walls of the clamping shoes 2 are provided with a groove 5 for slidable engagement with the inwards-facings, mutually parallel side edges of the legs of the frame 1. Thus, there is achieved a guiding means for retaining the clamping shoes in lateral direction, i.e. in a plane parallel to the substructure. It appears that the opposite grooves 5 in the clamping shoes 2 are located in a plane at right angles to the longitudinal axis of the clamped tube 4, and that the frame is thus oriented at right angles to the tube axis.

In order to keep the clamping shoes in place in the frame there is provided a fastening plate 6 which is inserted with its ends in notches 7 on each side of the inner side of the frame at the free ends of the legs which are thus constituting holding portions projecting beyond the clamping shoes. Instead of said notches there might have been provided pins or the like for retention of the fastening plate 6.

A suitable form of the fastening plate 6 is shown in FIG. 8. The fixing plate is provided with a pair of threaded holes 8 for the reception of suitable screws 9 (see FIG. 1) for exerting a clamping pressure force on the clamping shoes 2 when tightening the screws. The ends of the plate is formed as pin members 10 which by assembly go beyond the notches 7 in the frame 1 and thus in a simple manner assist in holding the plate in proper position by tightening of the screws 9 in the holes 8. It should be noted that one end of the fastening plate alternatively may be provided with e.g. rectangular or triangular notches instead of said pin members.

Especially for small dimensions of the clamping structure the fastening plate may be made of a resilient material and pushed in place and retained in the frame without the use of screws.

In order to distribute the pressure from the screws on the clamping shoes, a pressure distribution plate 11 is placed between the screws and the clamping shoes. The form of the plate appears from FIG. 9. The plate 11 is kept in place in the frame in that the frame goes into notches or incisions 12 at the ends of the plate. In the illustrated embodiment the plate is provided with a pair of recesses or depressions 13 assisting in guiding of the screws 9 of the fastening plate 6 by tightening of the screws. The plate 11 is mounted in the frame 1 in diagonal position and can not be taken out of the frame in horizontal position. The plate will therefore also serve as an effective temporary locking of the tube and clamping shoes within the frame during assembly. This will be a special advantage by assembly under ceilings where the free ends of the frame are directed downwards.

Figure 6A:
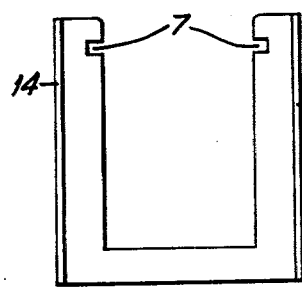
FIGS. 6A-6C illustrate an alternative embodiment of a frame, in front, top and side elevation view, respectively.
Figure 6C:
Figure 6B:

In FIGS. 6A–6C there is shown a modified embodiment of the frame 1. This is provided with flanges 14 to increase the rigidity of the frame in the longitudinal direction of the tube when only one frame is used.

Figure 7A:
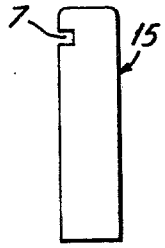
FIGS. 7A-7B illustrate an embodiment of a half of a frame intended for particularly large tube dimensions.
Figure 7B:
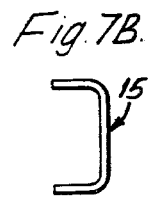

FIGS. 7A–7B shows an embodiment of a half 15 of a frame intended for particularly large tube dimensions. A pair of such frame halves 15 are placed opposite to each other with clamping shoes therebetween, which clamping shoes may then possibly rest against the substructure. The cross-sections of these frames may be of various shapes. They may be rectangular, or they may have angle shape as shown in FIG. 6B, or channel shape as shown in FIG. 7B. When using channel shape, there may also be used two sets of clamping shoes, wherein each of the flanges of the channel extends into grooves in two sets of the clamping shoes. Alternatively, the clamping shoes may be placed within the flanges of the channel. In this way the channel gets the function of grooves into which the clamping shoes extend.

The frame shown in FIGS. 1–2 is intended for welding attachment to the substructure. However, it may also be designed for screw attachment to the substructure, for example in that the lower part is provided with flanges with suitable holes (not shown).

The illustrated clamping structure is intended for clamping of single tubes. However, it may also be adapted for clamping of several tubes side by side. The recesses or cut-outs in the clamping shoes are then arranged side by side in a common profile. For the clamping of single tubes the clamping shoes may have externally circular form. The clamping shoes may then be cut from thick-walled extruded tubes and provided with grooves for frames. Such an embodiment is not shown in the drawings.

The clamping structure according to FIGS. 1 and 2 is assembled in that the frame 1 is initially attached to the substructure or support. Thereafter the lower clamping shoe 2 is inserted into the frame, the tube 4 is then placed on the clamping shoe, the upper clamping shoe is inserted into the frame, the pressure distribution plate 11 is inserted and finally the fastening plate 6 is inserted and the screws 9 are tightened. These screws are preferably of the threaded pin type (headless screws), i.e. screws with threads over the whole length, with an internally hexagonal hole in one end for a hexagon wrench. In this connection the screws have the advantage that they may be provided with locking nuts after having been mounted if this should appear to be necessary, for example by strong vibrations.

The clamping device according to the invention is also well suited for mounting of several tubes above each other. For such variants it is only necessary to increase the height of the frame to give room for additional clamping shoes above each other. The locking means remain unchanged. Externally the clamping shoes are adapted to the frame wherein they are to be fixed. The recesses or cut-outs in the clamping shoes are adapted to various tube dimensions. In this way one dimension of clamping shoes and frames are used for several different tube dimensions.

The clamping shoe may be made of a relatively hard material, advantageously a metallic or a synthetic material. In such cases e.g. rubber sleeves may be fitted in the clamping shoes in order to achieve a sound-dampened connection. Alternatively, the clamping shoes may be made of a more supple, sound-absorbing material. The frames may be made of a metallic material, or these too may be made of a synthetic material.

In FIGS. 10–11 there is shown another embodiment of the clamping structure according to the invention. In this embodiment there is used two frames 1 of a construction corresponding to the embodiment according to FIGS. 1–2, but with one frame placed on each side of the tube 4 to be clamped, and oriented parallel to the longitudinal axis of the tube. The frames receive a pair of clamping shoes 16 which, at opposite ends, on each side of their recesses 3, are provided with a pair of opposite grooves 17 for slidable engagement with the respective, inwards-facing side edges of the legs of the associated frames 1. In a similar way as in the embodiment according to FIGS. 1–2, there is provided a fastening plate 18 with a pair of through-going screws 19 for retention and clamping of the clamping shoes, together with a pressure distribution plate 20. These plates may be rectangular plates or bars and are not more closely shown.

In connection with clamping of single or individual tubes, the embodiment according to FIGS. 10–11 is particularly advantageous in connection with large loads. Moreover, the embodiment is especially well suited for clamping of several tubes side by side. The clamping shoes will then be correspondingly long with holes or cut-outs for the tubes and with recesses between the cut-outs for several frames. For the locking of the clamping shoes there may be used e.g. straight rods or bars going into notches in the frames. These bars may be inserted into the frames from the sides thereof, transversely to the longitudinal direction of the tubes. Further, the bars may be provided with distributed notches along both side edges, such that the ends of the frames fit into the notches when the bars are placed directly onto the frames and the clamping shoes. By thereafter displacing the bars until the notches in the frames and in the bars are moved past each other, the screws of the fastening plate may be tightened.

In order to increase the rigidity of the clamping shoes when two or more frames are used, it may be advantageous to place a flat profile or the like beneath the clamping shoes, which profile is kept in place by notches in the profile fitting into corresponding notches in the frames. These profiles need not be fixed to the substructure, and they are placed in the frames prior to the clamping shoes. Such an embodiment is shown in FIGS. 10–11 wherein a profile 21 with end notches 22 is placed in corresponding notches in the frame 1. Besides, the clamping shoes may also rest against the substructure if this is desired, e.g. to be able to omit said profile 21.

The construction according to the invention may of course be varied with utilization of the same principle. In the embodiments described above, the frames are of U-shaped configuration. However, it will be clear that the frames may also in some cases have a closed shape, i.e., O-shape. Such a frame configuration may e.g. be used in an embodiment corresponding to FIGS. 10–11 with respect to the orientation of the frames. In this case there must be used a modified embodiment of the clamping shoes which may be provided with grooves on the underside for the reception of the horizontal lower part of the frames. The clamping shoes are then inserted in the frame or frames from the side, at right angles to the tube or tubes. The upper clamping shoe will then be without grooves and will be kept in place in the transverse direction of the tube by the lower clamping shoe through the tube, and in the longitudinal direction of the tube by the vertical inner edges of the frame or frames. In order to reduce the height of the frame in view of the space which is necessary to insert the upper clamping shoe laterally above the tube, the upper clamping shoe may be provided with only a limited recess for the tube, and which does not surround half the circumference of the tube. Besides, the clamping shoes may also consist of a straight profile without recess for the tube. Such a profile will be kept in place in the longitudinal direction of the tube by the inner edges of the frame, and in the transverse direction of the tube by the fastening means acting between the profile and the upper internal edge of the frame. Such an embodiment is shown in FIGS. 14–15. In this embodiment there are provided a number of mutually parallel frames 23 of the above-mentioned, closed type, which are oriented parallel to juxtaposed, mutually parallel tubes 4. A lower clamping shoe 24 is provided with semi-cylindrical recesses for the tubes 4, and with grooves 25 on its underside for receiving the lower part of the frames. Between the upper side of the tube 4 and the upper part of the frames 21 there is inserted a fastening plate in the form of an elongate bar 26, wherein there is inserted screws 27 above the respective tube, said screws acting on a pressure distributing, elongate plate or bar 28 of a shape corresponding to the fastening plate 26.

The construction according to the invention also comprises the variants appearing by combining features from one or more of the described embodiments. For example, it is seen as a matter of course that the channel shape of the frame shown in FIG. 7B also appears by placing together opposite to each other a pair of frames of the type shown in FIG. 6B.

As regards the configuration of the ends of the fastening plate, as mentioned in connection with FIG. 8, it should be noted that one end may alternatively be provided with e.g. triangular notches or incisions instead of said pin members, or with similar incisions as shown for the pressure distributing plate according to FIG. 9.

In case of particularly high frames it may be advantageous to use a connecting member between the upper ends of the frame to prevent said edges from diverging from each other by tightening of the locking screws. Such a member may of course be of various configurations and is not shown in the drawings.

The binding member may e.g. be in the form of a beam which is inserted with its ends through holes at the free ends of the frame or frame members (cf. FIG. 7A), and is secured in a suitable manner. In this case the beam may also provide for retention of the fastening plate, so that the notches or the like shown in FIGS. 3, 6A and 7A, may be omitted. Such a beam may also be placed below the lower clamping shoe, and be extended through associated holes in the frame members. The tube with clamping shoes will then be lifted up from the substructure and the frame members consitute legs standing on the substructure.

In order to further simplify the assembly, the clamping structure may be mounted on a common collecting bar, and such bars may of course be of varying shape and construction.

I claim:
1. A clamping structure for clamping of tubes or similar elements, comprising:
 at least one clamping shoe for partly enclosing and retaining the element or elements to be clamped;
 at least one clamping shoe receiving frame for attachment to a substructure and defining a space for receiving said at least one clamping shoe;
 said frame having a pair of opposite parallel side portions defining guiding means in slidable engagement with mating guiding means provided on op- posite side portions of said at least one clamping shoe; and a fastening plate for fixing of said clamping shoe and said element to be clamped in said frame;

said fastening plate being provided with means for exerting a clamping pressure force directed towards the clamping shoe; and said frame being provided with holding portions projecting beyond said clamping shoe and being arranged to retain said fastening plate in a fixed position in said frame.

2. A clamping structure according to claim 1, wherein said means for exerting a clamping pressure force consists of at least one screw in threaded engagement with and extending through said fastening plate.

3. A clamping structure according to claim 2, wherein a pressure distribution plate is disposed between said at least one screw and the adjacent clamping shoe.

4. A clamping structure according to claim 1, wherein said frame is essentially U-shaped and has legs with inwards-facing mutually parallel edges, and said at least one clamping shoe has opposite side walls provided with opposite grooves for said slidable engagement with associated ones of said edges.

5. A clamping structure according to claim 4, wherein said opposite grooves of the clamping shoe are arranged in a plane essentially at right angles to the longitudinal axis of a tube clamped by said clamping shoe, for cooperation with said inwards-facing edges of a frame oriented at right angles to said tube axis.

6. A clamping structure according to claim 4, wherein said opposite grooves of the clamping shoe are arranged in a plane essentially parallel to the longitudinal axis of a tube clamped by said clamping shoe, for cooperation with said inwards-facing edges of an associated frame oriented parallel to said tube axis.

7. A clamping structure according to claim 1, wherein said frame is essentially U-shaped and has legs with inwards-facing mutually parallel channel members, and said at least one clamping shoe is provided with opposite side walls adapted for said slidable engagement in respective of said channel members.

8. A clamping structure according to claim 1, wherein said frame consists of a number of parts extending partly into grooves in the clamping shoe or shoes to provide said slidable engagement.

9. A clamping structure according to claim 1, wherein said frame consists of a number of parts with such a form that one or more edges of the clamping shoes extend into said parts to provide said slidable engagement.

10. A clamping device according to claim 1, wherein said frame consists of several parts which, after attachment to said substructure, and together with the substructure, define said clamping-shoe-receiving space.

* * * * *